US012258144B2

(12) United States Patent
Yang et al.

(10) Patent No.: US 12,258,144 B2
(45) Date of Patent: Mar. 25, 2025

(54) AIRCRAFT WING MOTION PREDICTION SYSTEMS AND ASSOCIATED METHODS

(71) Applicant: University of Washington, Seattle, WA (US)

(72) Inventors: Jinkyu Yang, Seattle, WA (US); Hiromi Yasuda, Tokyo (JP); Koshiro Yamaguchi, Seattle, WA (US); Yasuhiro Miyazawa, Seattle, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 427 days.

(21) Appl. No.: 17/612,941

(22) PCT Filed: May 29, 2020

(86) PCT No.: PCT/US2020/035335
§ 371 (c)(1),
(2) Date: Nov. 19, 2021

(87) PCT Pub. No.: WO2020/263501
PCT Pub. Date: Dec. 30, 2020

(65) Prior Publication Data
US 2022/0227498 A1 Jul. 21, 2022

Related U.S. Application Data

(60) Provisional application No. 62/854,877, filed on May 30, 2019.

(51) Int. Cl.
*B64D 45/00* (2006.01)
*B64C 23/06* (2006.01)
(Continued)

(52) U.S. Cl.
CPC ........ *B64D 45/0005* (2013.01); *B64C 23/065* (2013.01); *B64D 43/00* (2013.01);
(Continued)

(58) Field of Classification Search
None
See application file for complete search history.

(56) References Cited

U.S. PATENT DOCUMENTS 6,185,470 B1 * 2/2001 Pado .................... G05B 13/027
706/23
8,956,023 B1 * 2/2015 Hessling Von Heimendahl .........
B64D 47/02
362/470

(Continued)

OTHER PUBLICATIONS

"Boeing 777 Wing Flex Inflight Turbulence" created by MoosemanSG, Apr. 24, 2011. [Video] Available at <https://youtu.be/GzvA9tHNTyg>.

(Continued)

*Primary Examiner* — James J Lee
*Assistant Examiner* — Melanie G Huber
(74) *Attorney, Agent, or Firm* — Perkins Coie LLP

(57) ABSTRACT

Systems, devices, and methods for tracking and/or predicting motion of a wing of an aircraft are disclosed herein. The systems, devices, and methods track wing motion (e.g., in real-time). In some embodiments, the systems and devices include stereo binocular vision (SBV) cameras and/or light detection and ranging (LIDAR) emitters and receivers mounted on the aircraft. In these and other embodiments, the systems and devices include a network of contact sensors (e.g., accelerometers or strain gauges) mounted on a wing and corresponding receivers mounted on the aircraft. In these and other embodiments, based at least in part on the captured wing motion data, machine learning is employed to predict wing motion (e.g., normal, turbulent, and/or chaotic wing motion) of the aircraft.

6 Claims, 4 Drawing Sheets

(51) Int. Cl.
    *B64D 43/00* (2006.01)
    *G06V 20/56* (2022.01)

(52) U.S. Cl.
    CPC ........ *G06V 20/56* (2022.01); *B64D 2045/007* (2013.01); *B64D 2045/0085* (2013.01)

(56) References Cited

U.S. PATENT DOCUMENTS

| | | |
|---|---|---|
| 9,771,171 B1 | 9/2017 | Fleck |
| 9,776,731 B1* | 10/2017 | Lieberman .............. B64D 45/00 |
| 2012/0002038 A1 | 1/2012 | Furrer et al. |
| 2014/0012461 A1* | 1/2014 | Iannone ................... B64F 5/00 |
| | | 701/32.8 |
| 2015/0106005 A1 | 4/2015 | Wischmeyer |
| 2015/0312449 A1* | 10/2015 | Gibbins ............... G07C 5/0866 |
| | | 348/148 |
| 2016/0011073 A1 | 1/2016 | Long |
| 2016/0040984 A1 | 2/2016 | Byrne |
| 2016/0083075 A1 | 3/2016 | Moxon |
| 2017/0230635 A1* | 8/2017 | Zakrzewski ............. G01N 9/24 |
| 2017/0259943 A1* | 9/2017 | Fleck ..................... B64D 47/08 |
| 2018/0099740 A1* | 4/2018 | Provost .................. G01B 11/16 |
| 2018/0099761 A1* | 4/2018 | Griffiths .............. G01M 5/0041 |
| 2018/0164093 A1 | 6/2018 | Westcott |
| 2018/0171975 A1* | 6/2018 | Röhm ....................... B64C 3/46 |
| 2018/0261111 A1* | 9/2018 | Rutkiewicz ........... G01S 7/4802 |
| 2018/0321386 A1* | 11/2018 | Bosetti ................... G01S 17/95 |
| 2019/0096069 A1 | 3/2019 | Qian et al. |

OTHER PUBLICATIONS

"Easyjet Airbus A320 Startup & Takeoff from Gatwick | GoPro Wing View", created by GreatFlyer, Jul. 4, 2018. [Video] Available at <https://youtu.be/11VWGRRsBT0>.

International Search Report and Written Opinion mailed Jan. 6, 2021 for International Application No. PCT/US20/35335, 11 pages.

* cited by examiner

AIRCRAFT WING MOTION PREDICTION SYSTEMS AND ASSOCIATED METHODS

CROSS-REFERENCE TO RELATED APPLICATION

The present application is a national stage application under 35 U.S.C. § 371, of International Patent Application No. PCT/US2020/035335, filed May 29, 2020, which claims priority to U.S. Provisional Patent Application No. 62/854,877, filed May 30, 2019, each of which is incorporated herein by reference in its entirety.

TECHNICAL FIELD

The present disclosure is related to systems and methods for detecting and predicting motion of wings of an aircraft or other structures. In particular, the present disclosure is directed to systems and methods for predicting wing motion by applying machine learning techniques (such as neural network technologies) on data generated from non-contact sensors (e.g., light detection and ranging (LIDAR) or cameras) and/or contact sensors (e.g., accelerometers) carried by the aircraft.

BACKGROUND

Aircraft structures, such as wings or other aerodynamic surfaces, experience stress, flex, and vibration during flight. Such forces and movements may result from extreme maneuvers, gusts, turbulence, or other chaotic events, and they may contribute to wear or damage to the aircraft. Such forces and movements may also contribute to further chaotic motion of the aircraft, which may call for a pilot or autopilot system to react quickly. Existing technologies associated with measuring such forces and movements are limited to reactive systems that are only helpful in understanding flight events and structural issues after such events and issues have presented themselves. What is needed is a proactive approach to analyzing forces and movements of aircraft structures in flight.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present disclosure. The same reference number indicates the same element throughout the several views.

DETAILED DESCRIPTION

Figure 1:
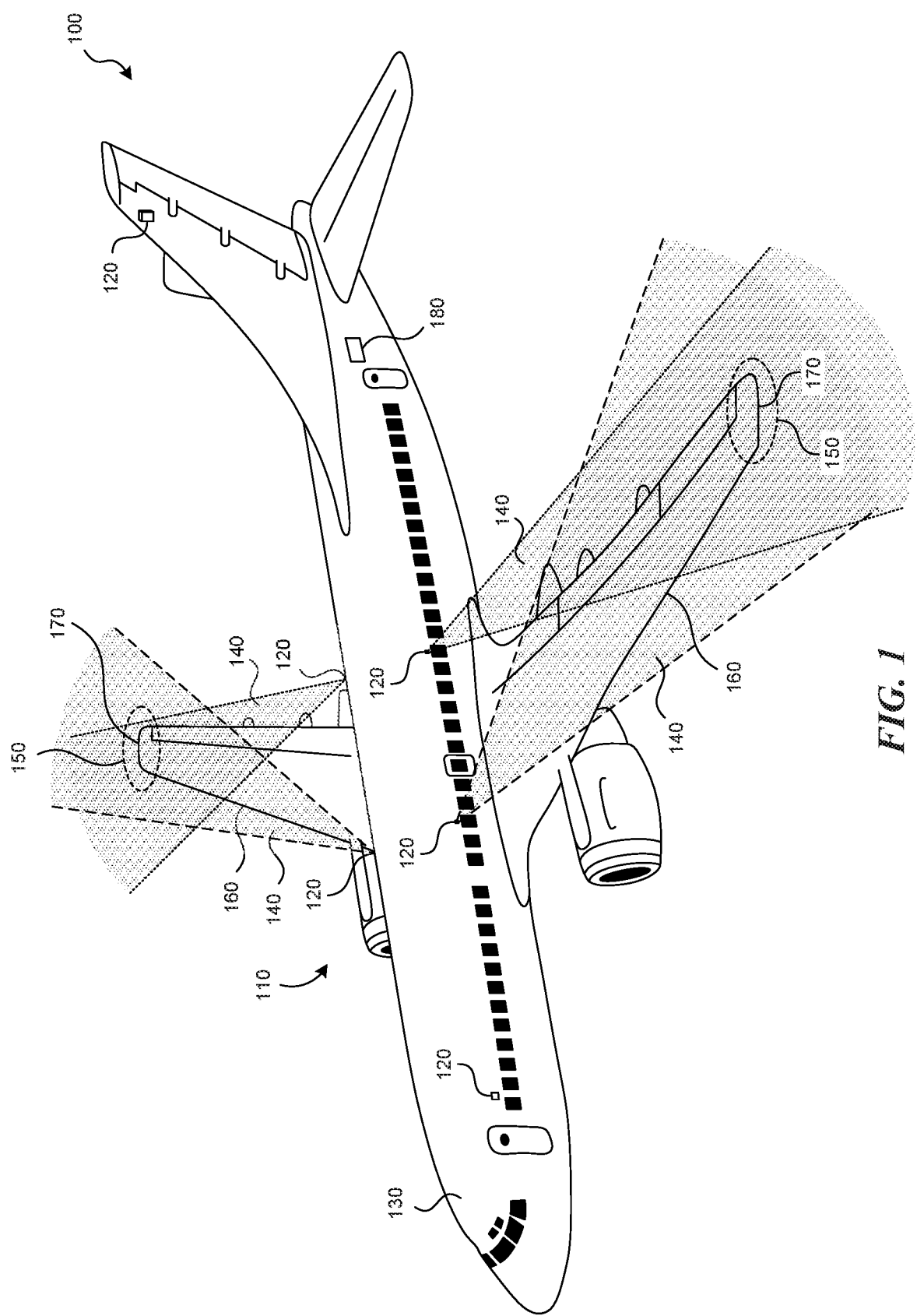
FIG. 1 is a partially schematic diagram of an aircraft wing motion tracking and prediction system configured in accordance with various embodiments of the present technology, using cameras.

The present technology is directed generally to systems and methods for tracking and predicting motion of wings of an aircraft or other structures. Systems and methods according to embodiments of the present technology determine (or provide data to determine) cause-and-effect connections between flight conditions and environmental factors (e.g., gusts, turbulence). Embodiments of the present technology also facilitate prediction of motion that may cause damage, cause impending chaotic wing behavior, or result in inefficient or uncomfortable flight. Systems may be operated, and methods may be performed, in real-time during flight. For example, in some embodiments, systems can predict (or at least provide early detection of) a sudden gust or other harsh aerodynamic event, and systems may input such predictions or detections into aircraft control systems to react quickly to the event. In some embodiments, systems can react to aerodynamic events faster than a human can. Accordingly, systems and methods according to embodiments of the present technology improve safety and efficiency during flight, and data can be used to improve future flights.

In one embodiment of the present technology, for example, an aircraft system includes one or more pairs of cameras carried by an aircraft and positioned to observe a portion of an aircraft wing. A first camera of a first pair of cameras may be spaced apart from a second camera of the first pair of cameras by a distance between the first and second cameras along a distance line. Each camera may be oriented toward the portion of the aircraft wing along a direction line, the direction line being oriented at an angle relative to the distance line. The system may further include a controller programmed with instructions that, when executed, cause the aircraft system to perform operations including: transmitting one or more images from each of the cameras to the controller as the cameras observe the portion of the aircraft wing; analyzing the one or more images from each camera to determine a position of the portion of the aircraft wing; recording movement of the portion of the aircraft wing; and predicting future motion of the portion of the aircraft wing based, at least in part, on the movement of the portion of the aircraft wing. In some embodiments, determining the position of the portion of the aircraft wing comprises comparing the one or more images with one or more reference images. The controller may include a neural network configured to execute machine-learning instructions for predicting future motion of the portion of the aircraft wing.

In further embodiments, the system may include one or more LIDAR sensors positioned to observe the portion of the aircraft wing. The operations may include analyzing distance data from the one or more LIDAR sensors and recording motion of the portion of the aircraft wing based at least in part on the distance data from the one or more LIDAR sensors.

In further embodiments, the system may include one or more motion sensors (e.g., one or more accelerometers, inertial measurement units, strain gauges, or other suitable motion sensors) attached to the aircraft wing, one or more transmitters connected to the one or more motion sensors, and one or more receivers carried by the aircraft and configured to receive motion data from the one or more motion sensors. The operations may comprise recording movement of the portion of the aircraft wing based on the motion data.

In another embodiment of the present technology, a wing-motion prediction system includes a computer-readable storage medium storing instructions that, when executed by a processor, cause the wing-motion prediction system to perform operations including receiving data representative of past deformation of a wing of an aircraft and processing the data through a neural network to predict future deformation of the wing of the aircraft.

In still another embodiment of the present technology, a method of operating an aircraft system includes capturing deflection data of a wing of an aircraft using sensors mounted on the aircraft, analyzing the captured data, and predicting motion of the wing of the aircraft based, at least in part, on the captured data. The sensors may include one or more motion sensors, LIDAR sensors, cameras, or other sensors suitable for sensing motion. Analyzing the captured data may include transmitting the captured data to a neural network machine learning algorithm and analyzing the captured data with the neural network machine learning algorithm.

Various embodiments of the technology are described herein. The following description provides specific details for a thorough understanding and an enabling description of these embodiments. One skilled in the art will understand, however, that the technology may be practiced without many of these details. Additionally, some well-known structures or functions, such as those associated with aircraft, cameras, LIDAR sensors, motion sensors, or machine learning (e.g., neural network technologies), may not be shown or described in detail for efficiency and to avoid unnecessarily obscuring the relevant description of the various embodiments. Accordingly, the technology may include other embodiments with additional elements or without several of the elements described below with reference to FIGS. 1-4.

The terminology used in the description presented below is intended to be interpreted in its broadest reasonable manner, even though it is being used in conjunction with a detailed description of certain specific embodiments of the technology. Certain terms may even be emphasized below; however, any terminology intended to be interpreted in any restrictive manner will be overtly and specifically defined as such in this detailed description section.

Specific details of several embodiments of the present technology are described herein with reference to wings and aircraft. The technology can also be implemented in other applications, including, for example, other aerodynamic support surfaces (such as tailfins), aerodynamic control surfaces, space vehicle structures, marine vehicle structures, or static structures such as buildings or bridges.

The following discussion provides a general description of a suitable environment in which the present technology may be implemented. Although not required, aspects of the technology described herein can be provided in the form of tangible and non-transitory machine-readable medium or media (such as a hard disk drive, hardware memory, etc.) having instructions recorded thereon for execution by a processor or computer. The set of instructions can include various commands that instruct the computer or processor to perform specific operations such as the methods and processes of the various embodiments described here. The set of instructions can be in the form of a software program or application. The computer storage media can include volatile and non-volatile media, and removable and non-removable media, for storage of information such as computer-readable instructions, data structures, program modules or other data. The computer storage media can include, but are not limited to, random access memory (RAM), read-only memory (ROM), erasable programmable read-only memory (EPROM), electrically erasable programmable read0-only memory (EEPROM), flash memory or other solid-state memory technology, compact disc read-only memory (CD-ROM), digital video disc (DVD), or other optical storage, magnetic disk storage, or any other hardware medium which can be used to store desired information and that can be accessed by components of the system. Components of the system can communicate with each other via wired or wireless communication. The components can be separate from each other, or various combinations of components can be integrated together into a monitor or processor or contained within a workstation with standard computer hardware (for example, processors, circuitry, logic circuits, memory, and the like). The system can include processing devices such as microprocessors, microcontrollers, integrated circuits, control units, storage media, and other hardware.

Aspects of the technology can also be practiced in distributed computing environments where tasks or modules are performed by remote processing devices, which are linked through a communication network (e.g., a wireless communication network, a wired communication network, a cellular communication network, the Internet, and/or a short-range radio network (e.g., via Bluetooth). In a distributed computing environment, program modules may be located in both local and remote memory storage devices. Those skilled in the relevant art will recognize that portions of the technology may reside on a server computer, while corresponding portions reside on a client/user computer. Data structures and transmission of data particular to aspects of the technology are also encompassed within the scope of the present technology.

A. WING MOTION TRACKING AND PREDICTION USING IMAGING

FIG. 1 is a partially schematic diagram of an aircraft system 100 configured in accordance with various embodiments of the present technology, including an imaging system 110 (which may be referred to as an optical system in some embodiments) for tracking and predicting wing motion. In some embodiments, the system 100 can include one or more (e.g., four) pairs of cameras 120 carried by an aircraft 130 (e.g., in cabin windows, on a side of the fuselage, or on a tail section, such as a vertical stabilizer or tailfin). In some embodiments, the cameras 120 can be high frame-rate action cameras (e.g., a HERO camera from GoPro, Inc.), or other cameras suitable for providing sufficient resolution and frame rates to observe and capture images or video of fast-moving objects. Each camera 120 observes a field of view (FOV) 140 directed generally toward a region of interest (ROI) 150 on individual wings 160 of the aircraft 130. The FOVs 140 of the cameras 120 in each pair of cameras 120 intersect (e.g., overlap) at or over one or more positions along each wing 160 of the aircraft 130, such as in the ROIs 150. In some embodiments, each ROI 150 can include a wingtip 170 of a corresponding wing 160. In other embodiments, each ROI 150 can include other sections of the wing 160 or the aircraft 130. The imaging system 110 can further include a controller 180 for carrying out instructions to perform operations associated with the system 100 (such as wing motion tracking and prediction operations, as described in additional detail below). The controller 180 may be carried on the aircraft 130 or located remotely from the aircraft 130 (e.g., in wireless communication with the system 100).

Figure 2:
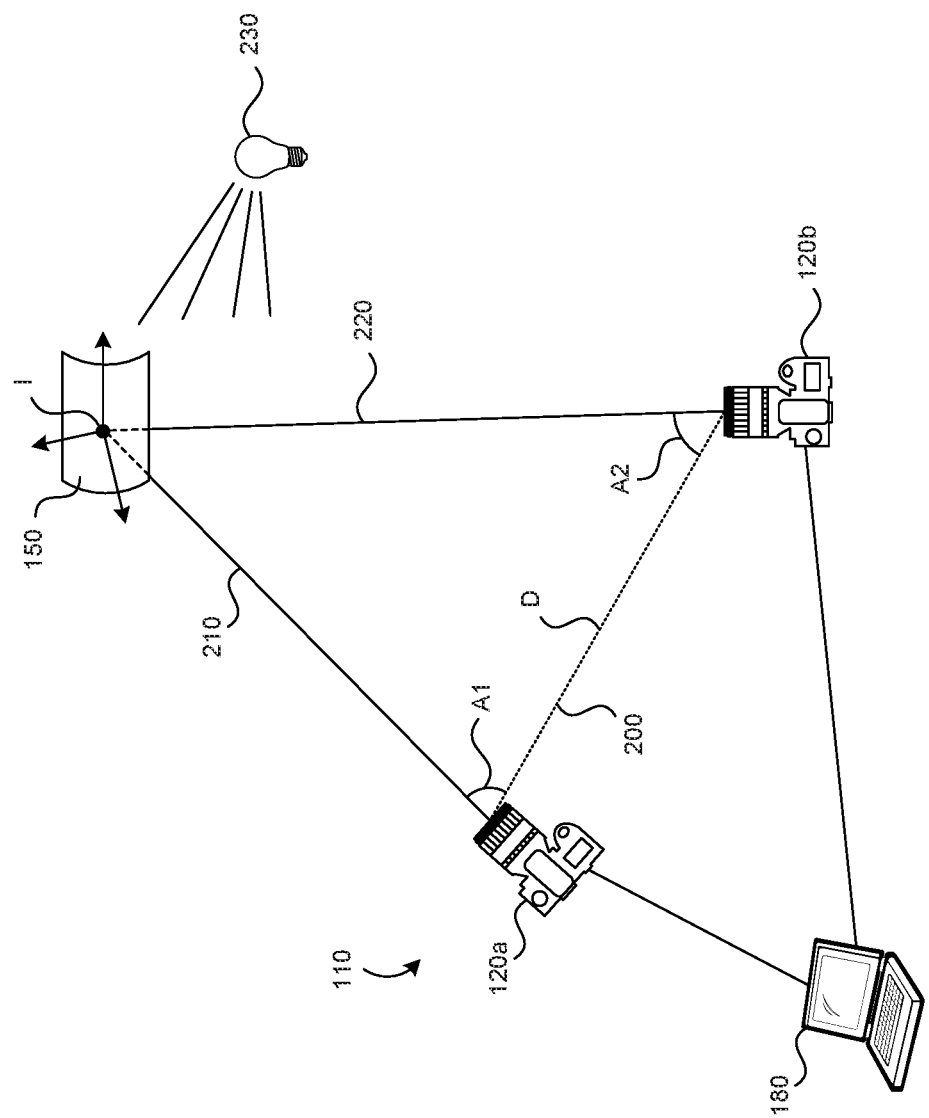
FIG. 2 is a partially schematic diagram of an aircraft wing motion tracking and prediction system configured in accordance with various embodiments of the present technology.

FIG. 2 is a schematic diagram of portions of the imaging system 110 of FIG. 1 configured in accordance with various embodiments of the present technology. In some embodiments, for example, the imaging system 110 can be configured to perform known stereo-binocular vision techniques to track motion within the ROI 150 (such as motion of one of the corresponding wingtips 170). Stereo-binocular vision techniques extract three-dimensional (3D) positions from two or more images of the 3D scene. In some embodiments, each pair of cameras 120 are spaced apart from each other along a distance line 200 by a known distance D. The cameras 120 can be in wired or wireless communication with a processing device, such as the controller 180. As mentioned previously, each camera 120 can be positioned to observe selected portions of the aircraft wing 160 (FIG. 1), such as ROI 150. In particular, a first camera 120a can be oriented toward the ROI 150 along direction line 210. The direction line 210 is oriented at an angle A1 relative to the distance line 200. A second camera 120b can be oriented toward the ROI 150 along direction line 220, which is oriented at an angle A2 relative to the distance line 220. The angles A1, A2 may be the same or different from each other. The cameras 120a-b capture images or video of the portion of the aircraft wing from the respective viewpoints and transmit the images/video to the controller 180 for processing.

The controller 180 receives the images or video and correlates the visual data to obtain 3D position information for the selected portion of the aircraft wing (e.g., the wingtip 170). In some embodiments, the controller 180 implements one or more angle of arrival (AOA) algorithms or digital image correlation (DIC) algorithms. For example, the position I of the portion of the aircraft wing in the ROI 150 may be obtained by calculating a triangle where the camera distance D and the angles A1, A2 are known. In further embodiments, determining the position of the portion of the aircraft wing 160 (FIG. 1) may be performed by comparing video or images from the cameras 120 with one or more reference videos or images (e.g., using Kernelized Correlation Filters on each image). The reference videos or images can include videos or images of the portion of the aircraft wing 160 in a neutral or unmoved position. A person of ordinary skill in the art will understand how to determine positions of an object using AOA or DIC techniques. Although two cameras 120 are shown in FIG. 2, in other embodiments, three or more cameras 120 may be used to determine the 3D position of the portion of the aircraft wing 160. The controller 180 records the motion or position of the portion of the aircraft wing 160 over time, which is used to train a neural network or another machine learning system to predict future motion of the aircraft wing, as explained in additional detail below.

In some embodiments, the cameras 120 may operate in the human visual spectrum. In other embodiments, however, the cameras 120 may be infrared, ultraviolet, or types of cameras adapted for sensing other types of light. In some embodiments, the system 110 can include a light source 230 positioned to illuminate the portion of the aircraft wing (e.g., the wingtip 170 in the ROI 150) to improve the quality of the images generated by the cameras 120. In some embodiments, the light source 230 may be positioned away from the portion of the aircraft wing 160 to illuminate towards the portion of the aircraft wing 160. In other embodiments, however, the light source 230 may be positioned on or at the selected portion of the aircraft wing 160.

Figure 3:
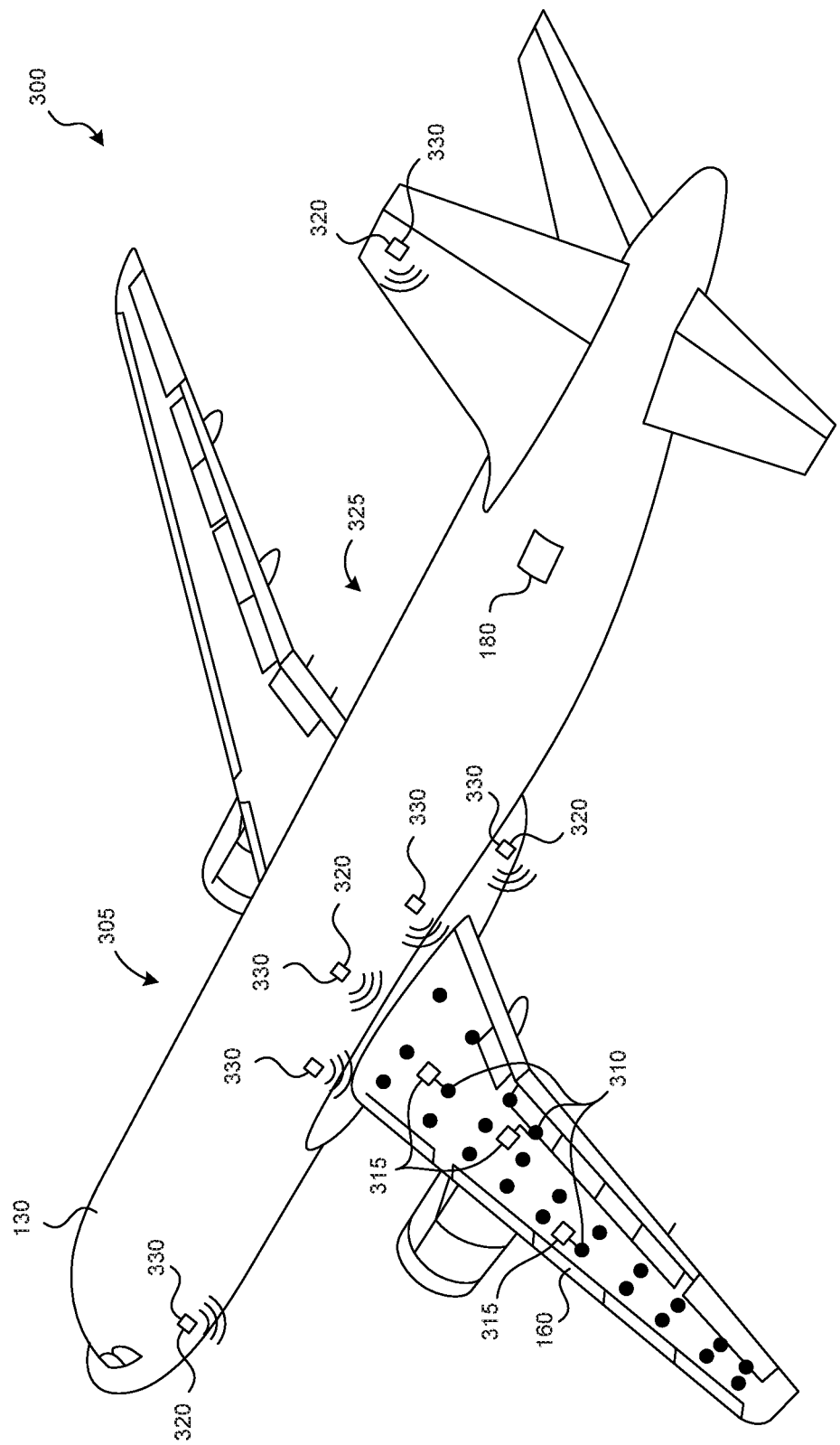
FIG. 3 is a partially schematic diagram of an aircraft wing motion tracking and prediction system configured in accordance with further embodiments of the present technology, using LIDAR systems or contact (on-wing) sensors.

B. Wing Motion Tracking and Prediction System Using On-Wing Sensors or LIDAR FIG. 3 is a partially schematic diagram of an aircraft system 300 configured in accordance with further embodiments of the present technology, including an on-wing sensor system 305. The on-wing sensor system 305 includes one or more sensor assemblies 310, which can include motion sensors such as strain gauges, accelerometers, inertial measurement units, or other sensors suitable for detecting motion. The sensor assemblies 310 can further include one or more corresponding transmitting devices 315 for transmitting motion data from the sensors. The sensor system 305 can further include one or more sensor receivers 320 carried by the aircraft 130. The sensor receivers 320 receive data generated by the motion sensors in the sensor assemblies 310. In some embodiments, the sensor assemblies 310 communicate with one or more of the sensor receivers 320 via wireless communication. In further embodiments, the sensor assemblies 310 communicate with one or more of the sensor receivers 320 via wired communication.

The on-wing sensor system 305 can further include a processing device (such as the controller 180) for carrying out instructions to perform operations associated with the on-wing sensor system 305 (such as wing motion tracking and prediction operations). The controller 180 receives motion or position data from the sensor assemblies 310 (for example, via the sensor receivers 320, or directly from the sensor assemblies 310) and records the data over time. The data can be used to train a neural network or another machine learning system to predict future motion of the wing, as explained in additional detail below.

In some embodiments, the aircraft system 300 can include a LIDAR system 325, which can include one or more LIDAR assemblies 330 (including corresponding emitters and detectors). The LIDAR assemblies 330 can be positioned or distributed on any suitable portion of the aircraft 130, such as where one or more of the sensor receivers 320 are positioned, or otherwise on the aircraft fuselage or empennage. For convenience in illustration and to avoid unnecessarily complicating the schematic in FIG. 3, the sensor receivers 320 and some of the LIDAR assemblies 330 are shown at the same position, to represent suitable example locations for positioning one or more of the sensor receivers 320 or the LIDAR assemblies 330. It will be appreciated, however, that in some embodiments the sensor receivers 320 and the LIDAR assemblies 330 may be positioned at different locations. The LIDAR assemblies 330 can measure distances to the portion of the aircraft wing 160 and track the changing distance over time to track motion of the portion of the aircraft wing 160.

The LIDAR system 325 can further include a processing device (such as the controller 180) for carrying out instructions to perform operations of the LIDAR system 325 (such as wing motion tracking and prediction operations). The processing device receives distance data from the LIDAR assemblies 330 and records the data over time to track motion of the portion of the aircraft wing. The data can be used to train a neural network or another machine learning system to predict future motion of the aircraft wing, as explained in additional detail below.

A wing motion prediction system configured in accordance with embodiments of the present technology can include one or more systems for tracking wing motion. A wing motion prediction system can further include the controller 180, which can be configured to carry out machine-learning techniques to analyze past motion data from the tracking systems and to predict future motion data. Although systems for tracking wing motion (such as the imaging system 110, the on-wing sensor system 305, and the LIDAR system 325) can be implemented individually or independently of one another (and their respective data used to predict future motion), in some embodiments, two or more systems for tracking wing motion may be combined to augment or supplement the wing motion tracking data.

C. Wing Motion Prediction Process

Figure 4:
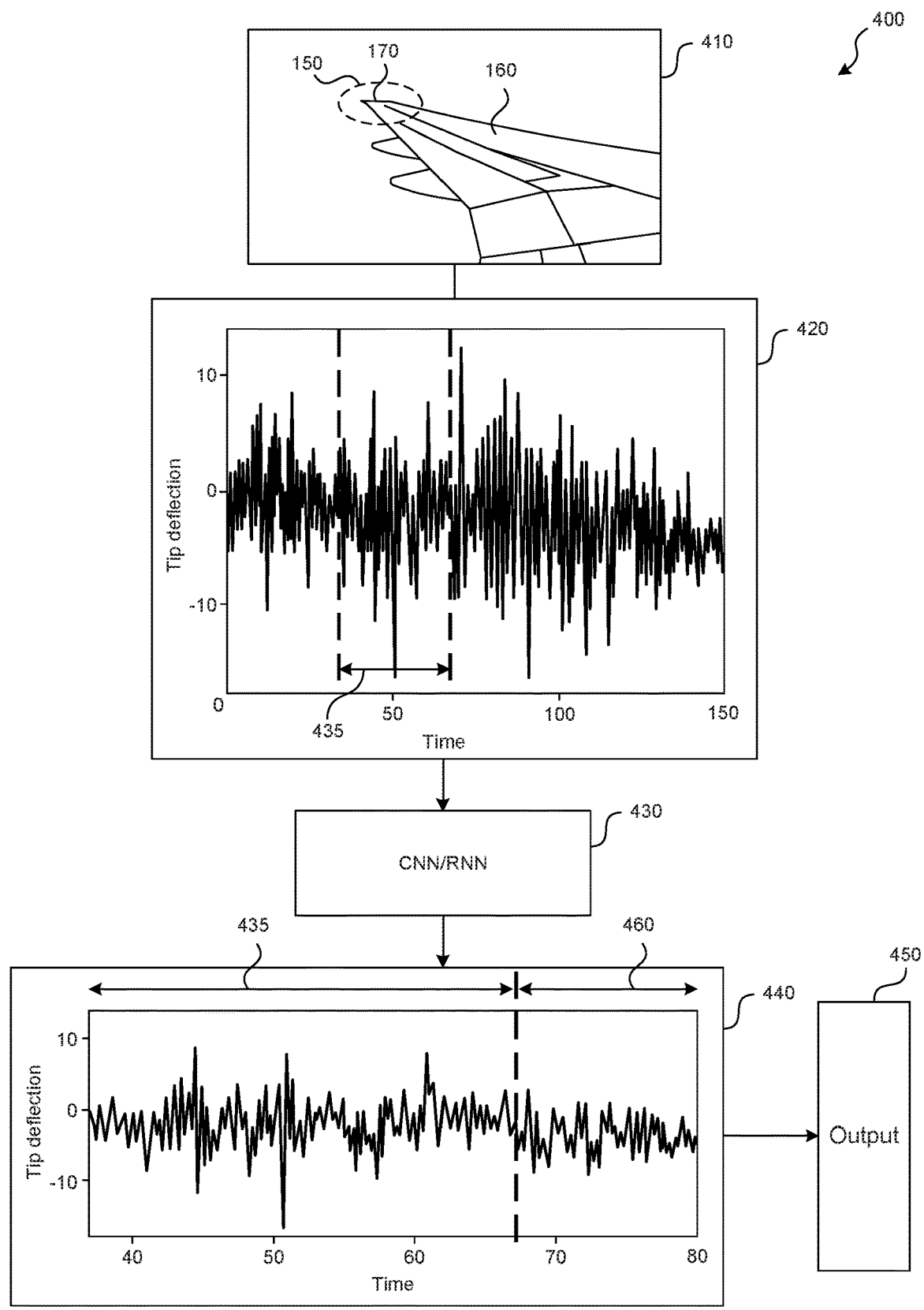
FIG. 4 illustrates a method for operating a wing motion tracking and prediction system configured in accordance with various embodiments of the present technology.

FIG. 4 illustrates a routine or method 400 for processing wing deflection data to generate wing motion prediction data in accordance with various embodiments of the present technology. Elements of the method 400 can be carried out by the controller 180, which can be programmed with instructions that, when executed, cause elements of the systems to perform operations of the method 400. Accordingly, the method 400 is described below with additional reference to FIGS. 1-3 above. In other embodiments, however, the method 400 may be carried out by other suitable components/systems.

Beginning at block 410, a representative portion of an aircraft wing 160, such as the wingtip 170, experiences motion. The cameras 120, sensor assemblies 310, or LIDAR assemblies 330 sense the motion.

At block 420, the processing device, such as the controller 180, records data representative of the motion of the aircraft wing (such as tip deflection). For example, in some embodiments, the controller 180 analyzes and tracks motion of the portion of the aircraft wing 160 within the region of interest 150 using a DIC or AOA technique, as explained in additional detail above. In further embodiments, the controller 180 records motion or position data from the sensor assemblies 310 or the LIDAR assemblies 330. A representative plot of recorded motion of the wingtip 170 is shown in block 420. In some embodiments, the motion is tracked as acceleration over time (for example, if the sensors are accelerometers).

At block 430, the processing device (e.g., the controller 180) inputs at least some of the motion or position data into a machine learning technique. In a particular example, training data 435 (see block 420) may be input into a neural network (e.g., a recurrent neural network or a convolutional neural network) configured to execute machine-learning instructions. In further embodiments, another suitable deep-learning or predictive analysis technique may be used to analyze the motion data.

At block 440, the processing device (e.g., the controller 180) executes the machine learning technique and outputs prediction data 460 (for example, based on the training data 435). The prediction data 460 includes a predicted wing motion (e.g., tip deflection) over time. In some embodiments, for further training of the neural network, the prediction data 460 can be compared to the actual data for the same time period and the machine learning technique can be appropriately calibrated. The prediction data 460 can include, for example, data representative of normal, turbulent, chaotic, and/or other wing motion.

At block 450, in some embodiments, the processing device (e.g., the controller 180) can output the future motion data (prediction data 460) or an alert or signal based on the future motion data. For example, the controller 180 can transmit the future motion data to a flight control system of the aircraft. In some embodiments, the flight control system can perform operations based on the future motion data, such as flight operations for preemptive action (e.g., the flight control system can adjust ailerons, flaps, rudders, elevators, and/or other control surfaces accordingly) to minimize sudden pitch, yaw, and/or roll motions generated by the aerodynamic events in the future motion data (e.g., turbulence, gusts, or other events or conditions). In some embodiments, the controller 180 can transmit an alert or a warning to pilots to notify pilots of a potential safety concerns. For example, if future motion data demonstrates that wing motions may be abnormal for a period of time, the controller 180 can alert crew to the possibility of aircraft damage (e.g., a bird strike or hail damage). In further embodiments, the controller 180 can transmit an alert or a warning to maintenance personnel that maintenance may be required due to the extent of the motion. The signal can include a warning of unusual or extreme motion of the portion of the aircraft wing, such as deflection of the wingtip.

Although the steps of the method 400 are discussed and illustrated in a particular order, the method 400 of FIG. 4 is not so limited. In other embodiments, for example, the method 400 can be performed in a different order. For example, any of the steps of the method 400 can be performed before, during, or after any of the other steps of the method 400. Operations of the method 400 can be performed concurrently on multiple sets of data. Moreover, a person of ordinary skill in the art will readily recognize that the method 400 can be altered and remain within embodiments of the present technology. For example, one or more steps of the method 400 can be omitted or repeated.

In some embodiments, the method 400 can be implemented to track deflection of only a portion of a wing, or it can be implemented to track overall deformation of a wing and to predict future overall deformation of the wing. For example, one or more of the imaging system 110, the on-wing sensor system 305, or the LIDAR system 325 can observe multiple points of the wing at the same time to record data representative of overall deformation of the wing, and the controller 180 can process the data through a neural network to predict future deformation of the wing based on the past movement of the multiple points.

D. EXAMPLES

Several aspects of the present technology are set forth in the following examples:

1. An aircraft system comprising:
   one or more pairs of cameras carried by an aircraft and positioned to observe a portion of an aircraft wing, wherein a first camera of a first pair of cameras is spaced apart from a second camera of the first pair of cameras by a distance between the first and second cameras along a distance line, and wherein each camera is oriented toward the portion of the aircraft wing along a direction line, the direction line being oriented at an angle relative to the distance line; and
   a controller programmed with instructions that, when executed, cause the aircraft system to perform operations comprising:
      transmitting one or more images from each of the cameras to the controller as the cameras observe the portion of the aircraft wing;
      analyzing the one or more images from each camera to determine a position of the portion of the aircraft wing, wherein determining the position of the portion of the aircraft wing comprises comparing the one or more images with one or more reference images;
      recording movement of the portion of the aircraft wing; and
      predicting future motion of the portion of the aircraft wing based, at least in part, on the movement of the portion of the aircraft wing.

2. The aircraft system of example 1, wherein the controller comprises a neural network configured to execute machine-learning instructions.
3. The aircraft system of example 1 or example 2, wherein the operations comprise outputting a signal based, at least in part, on the future motion of the portion of the aircraft wing.
4. The aircraft system of example 1 or example 2, wherein the operations comprise one or more of:
transmitting data representative of the future motion of the portion of the aircraft wing to a flight control system of the aircraft, wherein the flight control system performs a flight operation based, at least in part, on the data representative of the future motion; or
transmitting an alert to warn crew of extreme motion of the portion of the aircraft wing or damage to the aircraft.
5. The aircraft system of any one of examples 1-4, wherein the portion of the aircraft wing comprises a wing tip and wherein movement of the wing tip comprises deflection of the wing tip.
6. The aircraft system of any one of examples 1-5, further comprising one or more lights positioned to illuminate the portion of the aircraft wing.
7. The aircraft system of any one of examples 1-6, comprising four pairs of cameras.
8. The aircraft system of any one of examples 1-7, wherein the cameras are infrared cameras.
9. The aircraft system of any one of examples 1-8, further comprising one or more LIDAR sensors positioned to observe the portion of the aircraft wing, and wherein the operations comprise analyzing distance data from the one or more LIDAR sensors and recording motion of the portion of the aircraft wing based at least in part on the distance data from the one or more LIDAR sensors.
10. The aircraft system of any one of examples 1-9, further comprising:
one or more motion sensors attached to the aircraft wing;
one or more transmitters connected to the one or more motion sensors; and
one or more receivers carried by the aircraft and configured to receive motion data from the one or more motion sensors; wherein
the operations comprise recording movement of the portion of the aircraft wing based on the motion data.
11. The aircraft system of example 10, wherein the one or more motion sensors includes an accelerometer or an inertial measurement unit.
12. An aircraft system comprising:
one or more LIDAR sensors carried by an aircraft and positioned to observe a portion of an aircraft wing; and
a controller programmed with instructions that, when executed, cause the aircraft system to perform operations comprising:
observing the portion of the aircraft wing via the LIDAR sensors; and
based on data from the LIDAR sensors, recording movement of the portion of the aircraft wing; and
based on movement of the portion of the aircraft wing, predicting future motion of the portion of the aircraft wing.
13. The aircraft system of example 12, wherein the controller comprises a recurrent neural network or a convolutional neural network configured to execute machine-learning instructions.
14. The aircraft system of example 12 or example 13, wherein the operations comprise outputting a signal based, at least in part, on the future motion of the portion of the aircraft wing.
15. The aircraft system of example 12 or example 13, wherein the operations comprise one or more of:
transmitting data representative of the future motion of the portion of the aircraft wing to a flight control system of the aircraft, wherein the flight control system performs a flight operation based, at least in part, on the data representative of the future motion; or
transmitting an alert to warn crew of extreme motion of the portion of the aircraft wing or damage to the aircraft.
16. The aircraft system of any one of examples 12-15, wherein the portion of the aircraft wing comprises a wing tip and wherein movement of the wing tip comprises deflection of the wing tip.
17. The aircraft system of any one of examples 12-16, further comprising one or more pairs of cameras carried by the aircraft and positioned to observe the portion of the aircraft wing, wherein:
a first camera of a first pair of cameras is spaced apart from a second camera of the first pair of cameras by a distance between the first and second cameras along a distance line, and wherein each camera is oriented toward the portion of the aircraft wing along a direction line, the direction line being oriented at an angle relative to the distance line; and
the operations comprise:
transmitting one or more images from each of the cameras to the controller as the cameras observe the portion of the aircraft wing;
analyzing the one or more images from each camera to determine the position of the portion of the aircraft wing, wherein determining the position of the portion of the aircraft wing comprises comparing the one or more images with one or more reference images;
recording movement of the portion of the aircraft wing; and
predicting future motion of the portion of the aircraft wing based, at least in part, on the movement of the portion of the aircraft wing.
18. The aircraft system of any one of examples 12-17, further comprising:
one or more motion sensors attached to the aircraft wing;
one or more transmitters connected to the one or more motion sensors; and
one or more receivers carried by the aircraft and configured to receive motion data from the one or more motion sensors; wherein
the operations comprise recording movement of the portion of the aircraft wing based on the motion data.
19. A wing-motion prediction system comprising a computer-readable storage medium storing instructions that, when executed by a processor, cause the wing-motion prediction system to perform operations comprising:
receiving data representative of past deformation of a wing of an aircraft; and
processing the data through a neural network to predict future deformation of the wing of the aircraft.
20. The wing-motion prediction system of example 19, further comprising a pair of cameras, wherein the operations comprise:

transmitting one or more images from each of the cameras to the controller as the cameras observes the portion of the aircraft wing;
analyzing the one or more images from each camera to determine a position of the portion of the aircraft wing, wherein determining the position of the portion of the aircraft wing comprises comparing the one or more images with one or more reference images;
recording movement of the portion of the aircraft wing as the data representative of past deformation of the wing.

21. The wing-motion prediction system of example 19 or example 20, further comprising one or more LIDAR sensors positioned to observe the aircraft wing, wherein the operations comprise:
causing the LIDAR sensors to observe a portion of the aircraft wing; and
based on data from the LIDAR sensors, recording movement of the portion of the aircraft wing as the data representative of past deformation of the wing.

22. The wing-motion prediction system of any one of examples 19-21, further comprising one or more motion sensors attached to the wing, wherein the operations comprise receiving motion data from the one or more motion sensors and recording the motion data as the data representative of past deformation of the wing.

23. The wing-motion prediction system of any one of examples 19-22, wherein the neural network comprises a recurrent neural network or a convolutional neural network configured to execute machine-learning instructions.

24. A method of operating an aircraft system, the method comprising:
capturing deflection data of a wing of an aircraft using sensors mounted on the aircraft;
analyzing the captured data; and
predicting motion of the wing of the aircraft based, at least in part, on the captured data.

25. The method of example 24 wherein the sensors include at least one pair of cameras, and wherein capturing the deflection data includes capturing images of a portion of the wing of the aircraft using the pair of cameras.

26. The method of example 24 or example 25 wherein the sensors include at least one sensor carried by the wing of the aircraft.

27. The method of any one of examples 24-26 wherein the sensors include at least one LIDAR emitter and receiver.

28. The method of any one of examples 24-27 wherein analyzing the captured data includes transmitting the captured data to a neural network machine learning algorithm.

29. The method of any one of examples 24-28 wherein predicting motion of the wing of the aircraft includes predicting future motion of the wing of the aircraft based, at least in part, on historical data of the motion of the wing.

30. The method of any one of examples 24-29, further comprising predicting aircraft maintenance based at least in part on the analyzing or on the predicting.

31. The method of any one of examples 24-30 wherein predicting the motion of the wing of the aircraft includes separating the captured data into training data and actual data, and wherein predicting the motion of the wing of the aircraft is based at least in part on the training data.

32. The method of any one of examples 24-31, further comprising comparing the prediction of the motion of the wing of the aircraft to actual motion of the wing of the aircraft using the actual data.

33. The method of any one of examples 24-32, further comprising transmitting results of the analyzing or of the predicting to a flight control system of the aircraft.

34. The method of example 33, further comprising performing a flight operation based on the results of the analyzing or of the predicting.

35. The method of any one of examples 24-34, further comprising notifying a pilot of the aircraft of potential safety concerns based, at least in part, on the analyzing or on the predicting.

E. CONCLUSION

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. Moreover, the various embodiments described herein may also be combined to provide further embodiments. In some embodiments, additional sensor assemblies, LIDAR systems, or cameras may be included to increase the quantity of data available to the machine learning techniques or neural networks. In some embodiments, systems may be customized for a specific type or configuration of aircraft to aid in training the machine learning techniques or neural network. Although "cameras" and "vision" are described herein, further embodiments of the present technology include cameras and imaging technologies that operate outside of the visual spectrum, such as infrared or ultraviolet.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. Additionally, the term "comprising" is used throughout to mean including at least the recited feature(s) such that any greater number of the same feature and/or additional types of other features are not precluded. To the extent any of the materials incorporated herein by reference conflict with the present disclosure, the present disclosure controls. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. An aircraft system comprising:
one or more LIDAR sensors carried by an aircraft and positioned to observe a portion of an aircraft wing; and
a controller programmed with instructions that, when executed, cause the aircraft system to perform operations comprising:
   observing the portion of the aircraft wing via the one or more LIDAR sensors;
   based on data from the one or more LIDAR sensors, recording movement of the portion of the aircraft wing; and
   based on movement of the portion of the aircraft wing, predicting future motion of the portion of the aircraft wing.

2. The aircraft system of claim 1, wherein the operations comprise outputting a signal based, at least in part, on the future motion of the portion of the aircraft wing.

3. The aircraft system of claim 1, wherein the operations comprise one or more of:
   transmitting data representative of the future motion of the portion of the aircraft wing to a flight control system of the aircraft, wherein the flight control system performs a flight operation based, at least in part, on the data representative of the future motion; or
   transmitting an alert to warn crew of extreme motion of the portion of the aircraft wing or damage to the aircraft.

4. The aircraft system of claim 1, wherein the portion of the aircraft wing comprises a wing tip and wherein movement of the wing tip comprises deflection of the wing tip.

5. The aircraft system of claim 1, further comprising one or more pairs of cameras carried by the aircraft and positioned to observe the portion of the aircraft wing, wherein:
a first camera of a first pair of cameras is spaced apart from a second camera of the first pair of cameras by a distance between the first and second cameras along a distance line, and wherein each camera is oriented toward the portion of the aircraft wing along a direction line, the direction line being oriented at an angle relative to the distance line; and
the operations comprise:
   transmitting one or more images from each of the cameras to the controller as the cameras observe the portion of the aircraft wing;
   analyzing the one or more images from each camera to determine a position of the portion of the aircraft wing, wherein determining the position of the portion of the aircraft wing comprises comparing the one or more images with one or more reference images;
   recording movement of the portion of the aircraft wing; and
   predicting future motion of the portion of the aircraft wing based, at least in part, on the movement of the portion of the aircraft wing.

6. The aircraft system of claim 1, further comprising:
one or more motion sensors attached to the aircraft wing;
one or more transmitters connected to the one or more motion sensors; and
one or more receivers carried by the aircraft and configured to receive motion data from the one or more motion sensors; wherein
the operations comprise recording movement of the portion of the aircraft wing based on the motion data.

* * * * *